(12) United States Patent
Imoto et al.

(10) Patent No.: US 6,270,547 B1
(45) Date of Patent: Aug. 7, 2001

(54) HYDROGEN ABSORBING ALLOY ELECTRODE AND PROCESS FOR FABRICATING SAME

(75) Inventors: Teruhiko Imoto; Kikuko Kato, both of Katano; Yohei Hirota, Itano; Nobuyuki Higashiyama, Ikeda; Mamoru Kimoto, Hirakata; Shin Fujitani, Hirakata; Koji Nishio, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/508,696

(22) PCT Filed: Sep. 28, 1998

(86) PCT No.: PCT/JP98/04351
§ 371 Date: Mar. 29, 2000
§ 102(e) Date: Mar. 29, 2000

(87) PCT Pub. No.: WO99/17387
PCT Pub. Date: Aug. 4, 1999

(30) Foreign Application Priority Data

Sep. 30, 1997 (JP) .................................................. 9-266909

(51) Int. Cl.$^7$ ....................................................... B22F 1/02
(52) U.S. Cl. ................. 75/228; 75/232; 419/30; 419/19; 419/20
(58) Field of Search .................. 75/228, 232; 419/30, 419/19, 20

(56) References Cited

FOREIGN PATENT DOCUMENTS

| 4-169062 | 6/1992 | (JP) . |
| 05225975 | 9/1993 | (JP) . |
| 07326353 | 12/1995 | (JP) . |

Primary Examiner—Roy King
Assistant Examiner—Nicole Coy
(74) Attorney, Agent, or Firm—Arent Fox Kintner Plotkin & Kahn, PLLC

(57) ABSTRACT

A hydrogen absorbing alloy electrode characterized in that the electrode consists mainly of a mixture of a first hydrogen absorbing alloy powder A formed on surfaces of particles thereof with a surface layer 22 containing metallic copper or a copper oxide and a second hydrogen absorbing alloy powder B formed on surfaces of particles thereof with a surface layer 24 containing metallic cobalt or a cobalt oxide. The copper-coated hydrogen absorbing alloy powder A affords improved electric conductivity, and the cobalt-coated hydrogen absorbing alloy powder B gives improved ability to absorb and desorb hydrogen, whereby the electrode is improved in different battery characteristics, such as cycle characteristics, high-rate discharge characteristics and infernal pressure characteristics, at the same time.

7 Claims, 2 Drawing Sheets

HYDROGEN ABSORBING ALLOY ELECTRODE AND PROCESS FOR FABRICATING SAME

TECHNICAL FIELD

The present invention relates to hydrogen absorbing alloy electrodes for use as negative electrodes of alkaline secondary batteries such as nickel-metal hydride batteries and a process for fabricating the electrode, and more particularly to improvements in the surface characteristics of hydrogen absorbing alloys.

BACKGROUND ART

While nickel-cadmium batteries and lead acid batteries are already in wide use as secondary batteries, it is desired especially in recent years to develop secondary batteries which have a high energy density and are yet clean with advances in compact information devices such as cellular phones and notebook computers. Accordingly attention has been directed to closed-type nickel-metal hydride batteries which are free from harmful substances such as cadmium and lead and wherein an electrode of hydrogen absorbing alloy is used as the negative electrode.

Nickel-metal hydride batteries comprise a negative electrode of hydrogen absorbing alloy, a positive electrode of nickel, an alkaline electrolyte, a separator, etc. The hydrogen absorbing alloy electrode serving as the negative electrode is prepared by adding a binder to a hydrogen absorbing alloy powder obtained by pulverizing a hydrogen absorbing alloy ingot, and forming the mixture to a shape of an electrode. The hydrogen absorbing alloys developed for use in the negative electrode include those of the Misch metal type comprising a Misch metal (hereinafter referred to as "Mm") which is a mixture of rare-earth elements and Laves phase hydrogen absorbing alloys.

With alkaline secondary batteries, such as nickel-metal hydride batteries, wherein a negative electrode of hydrogen absorbing alloy is used, a gas-phase reaction and an electrochemical reaction proceed at the same time on the surface of the hydrogen absorbing alloy by virtue of the contact of the alloy surface with the alkaline electrolyte. More specifically, in the relationship between the hydrogen pressure and the temperature, hydrogen is absorbed by the hydrogen absorbing alloy, or the hydrogen absorbing alloy desorbs hydrogen (gas-phase reaction). In the relationship between the voltage and the current, on the other hand, application of voltage (charging) causes absorption of hydrogen by the hydrogen absorption alloy of the hydrogen produced by the electrolysis of water, and delivery of current (discharge) causes oxidation of hydrogen to water (electrochemical reaction).

To promote such gas-phase reaction and electrochemical reaction on the hydrogen absorbing alloy surface, a powder of electric conductor is added to the electrode, or the hydrogen absorbing alloy surface is chemically treated, whereas if the attempt to improve the hydrogen absorbing alloy is made singly, various characteristics of the hydrogen absorbing alloy are merely improved partially, and appearance of a new limiting factor hampers great improvements in the characteristics of the alkaline secondary battery.

An object of the present invention is to provide a hydrogen absorbing alloy electrode which is given outstanding battery characteristics by simultaneously ameliorating problems encountered with hydrogen absorbing alloys in the electric conductivity, gas affinity, etc. which are associated with the gas-phase reaction and electrochemical reaction.

DISCLOSURE OF THE INVENTION

A hydrogen absorbing alloy electrode embodying the present invention consists mainly of a mixture of a first hydrogen absorbing alloy powder A formed on surfaces of particles thereof with a surface layer 22 containing metallic copper or a copper oxide and a second hydrogen absorbing alloy powder B formed on surfaces of particles thereof with a surface layer 24 containing metallic cobalt or a cobalt oxide.

Copper is an element having a extremely high electric conductivity. The surface layer 22 formed on the surfaces of hydrogen absorbing alloy particles 21 and containing metallic copper or a copper oxide promotes the migration of electrons due to the acceptance of hydrogen atoms by the surface of the hydrogen absorbing alloy, contributing to improvements in high-rate discharge characteristics and suppressing the formation of gas due to a side reaction. Cobalt has high affinity for gases and has catalytic activity to promote dissociation of hydrogen molecules and combination thereof with oxygen atoms on the surface of the hydrogen absorbing alloy. Accordingly, the surface layer 24 formed on the surfaces of hydrogen absorbing alloy particles 23 and containing metallic cobalt or a cobalt oxide promotes absorption of hydrogen by the hydrogen absorbing alloy and a water forming reaction due to the recombination of the gaseous oxygen produced on the surface of the positive electrode and the hydrogen atoms produced on the surface of the negative electrode. This consequently suppresses the rise in the battery internal pressure during the charge-discharge reactions and leads to improved cycle characteristics.

Accordingly, the alkaline secondary batteries incorporating the hydrogen absorbing alloy electrode of the invention exhibit unprecedented excellent battery characteristics which are attributable to the presence of the two kinds of hydrogen absorbing alloys having surface layers of two kinds of metals which are different in effect.

Moreover, the surface layers of the hydrogen absorbing alloy powders protect the exposed active sites on the surface of the alloy from oxidation, thereby contributing also to improvements in cycle characteristics.

Stated specifically, the first hydrogen absorbing alloy powder A is smaller than the second hydrogen absorbing alloy powder B in particle size for use in the mixture. Further the amount (by weight) of the first hydrogen absorbing alloy powder A is not greater than the amount (by weight) of the second hydrogen absorbing alloy powder B in the mixture to be used.

The first hydrogen absorbing alloy powder A is itself capable of absorbing and desorbing hydrogen, therefore present as an active substance and serves also as a conductive material because the copper atoms present in the surface layer have satisfactory electric conductivity. Accordingly, when the particles of the first hydrogen absorbing alloy powder A form a bridge between the particles of the second hydrogen absorbing alloy powder B or between the particles of the second hydrogen absorbing alloy powder B and a current collector, electrons can be transmitted efficiently. Further when the first hydrogen absorbing alloy powder A is smaller than the second hydrogen absorbing alloy powder B in particle size, the first powder A is present in the interstices between the particles of the second powder B, giving an increased fractional solids content to the electrode alloy, so that the alkaline secondary battery incorporating such a hydrogen absorbing alloy electrode exhibits satisfactory battery characteristics.

To obtain satisfactory battery characteristics by using the hydrogen absorbing alloy electrode in alkaline secondary batteries, it is desired that the amount of the second hydrogen absorbing alloy powder B be greater than the amount of the first hydrogen absorbing alloy powder A in the mixture as will be apparent from the experimental result to be given later.

A process for preparing the hydrogen absorbing alloy electrode embodying the present invention has a step of preparing a first hydrogen absorbing alloy powder A, a step of preparing a second hydrogen absorbing alloy powder B, and a step of preparing an electrode by mixing together the two kinds of hydrogen absorbing alloy powders obtained by these steps and forming the mixture into a predetermined shape. In the step of preparing a first hydrogen absorbing alloy powder A, the alloy powder is subjected to a surface treatment with an acid solution containing a copper chloride ($CuCl_2$) and adjusted to a pH value of 0.7 to 2.0, and in the step of preparing a second hydrogen absorbing alloy powder B, the alloy powder is subjected to a surface treatment with an acid solution containing a cobalt chloride ($CoCl_2$) or cobalt hydroxide ($Co(OH)_2$) and adjusted to a pH value of 0.7 to 2.0.

A film of an oxide or the like is generally formed on the surfaces of hydrogen absorbing alloys by spontaneous oxidation. When an electrode is fabricated from such a hydrogen absorbing alloy and used as the negative electrode of an alkaline secondary battery, the hydrogen absorbing alloy is initially low in activity, giving lower characteristics to the battery initially or at low temperatures.

The process for preparing a hydrogen absorbing alloy electrode embodying the invention has a step of removing the oxide layer in an acid solution to obviate the drawback. Stated specifically, the hydrogen absorbing alloy is immersed in an acid solution to dissolve the oxide layer on the surface. Active sites are exposed on the hydrogen absorbing alloy surface by this step, and a surface layer of copper or a copper oxide, or cobalt or a cobalt oxide is thereafter formed on the hydrogen absorbing alloy surface, whereby the active sites can be protected from re-oxidation.

If the acid solution has too low an initial pH value in this step, a tough oxide film will be formed on the hydrogen absorbing alloy surface, whereas if the initial pH value is excessively high, the oxide film will not be completely removed, failing to give improved battery characteristics to the hydrogen absorbing alloy electrode. It is therefore desired that the acid solution for use in this step be 0.7 to 2.0 in initial pH value.

Stated further specifically, the solution for use in the step of preparing the first hydrogen absorbing alloy powder A contains 1.0 wt. % to 5.0 wt. % of a copper chloride ($CuCl_2$) based on the weight of the hydrogen absorbing alloy. Further the solution for use in the step of preparing the second hydrogen absorbing alloy powder B contains 1.0 wt. % to 5.0 wt. % of a cobalt chloride ($CoCl_2$) based on the weight of the hydrogen absorbing alloy. In place of cobalt chloride ($CoCl_2$), a cobalt hydroxide ($Co(OH)_2$) can be used in an amount of 0.3 wt. % to 1.0 wt. % based on the weight of the hydrogen absorbing alloy.

In the case where the hydrogen absorbing alloy powder protected by the surface layer comprising copper or cobalt against oxidation as with air is used for the hydrogen absorbing alloy electrode of the alkaline secondary battery, the outer surface coating of the surface layer partly dissolves in the electrolyte and reduces in thickness. The surface layer remaining on the hydrogen absorbing alloy surface at this time hampers the absorption or desorption of hydrogen by the hydrogen absorbing alloy if having an excessive thickness, or permits the oxygen present in the electrolyte to oxidize the active sites if having too small a thickness.

Accordingly, the concentration of copper chloride ($CuCl_2$) in the acid solution for surface-treating the starting hydrogen absorbing alloy powder therein in the step of preparing the first hydrogen absorbing alloy powder A is preferably 1.0 wt. % to 5.0 wt. % based on the weight of the hydrogen absorbing alloy. On the other hand, the concentration of cobalt chloride ($CoCl_2$) in the acid solution for surface-treating the starting hydrogen absorbing alloy powder therein in the step of preparing the second hydrogen absorbing alloy powder B is preferably 1.0 wt. % to 5.0 wt. % based on the weight of the hydrogen absorbing alloy. When a cobalt hydroxide ($Co(OH)_2$) is used, the concentration thereof is preferably 0.3 wt. % to 1.0 wt. % based on the weight of the hydrogen absorbing alloy.

The alkaline secondary battery incorporating the hydrogen absorbing alloy electrode of the invention exhibits a synergistic effect attributable to the presence of the two kinds of hydrogen absorbing alloy powders which are different in properties to serve as negative electrode active substances, i.e., a hydrogen absorbing alloy powder A having a surface layer containing highly conductive copper and a hydrogen absorbing alloy powder B having a surface layer containing cobalt which is in battery internal pressure characteristics and cycle characteristics. The alkaline secondary battery is further superior in battery characteristics to the one fabricated with use of only one of these powders for improvement.

BEST MODE OF CARRYING OUT THE INVENTION

Figure 1:
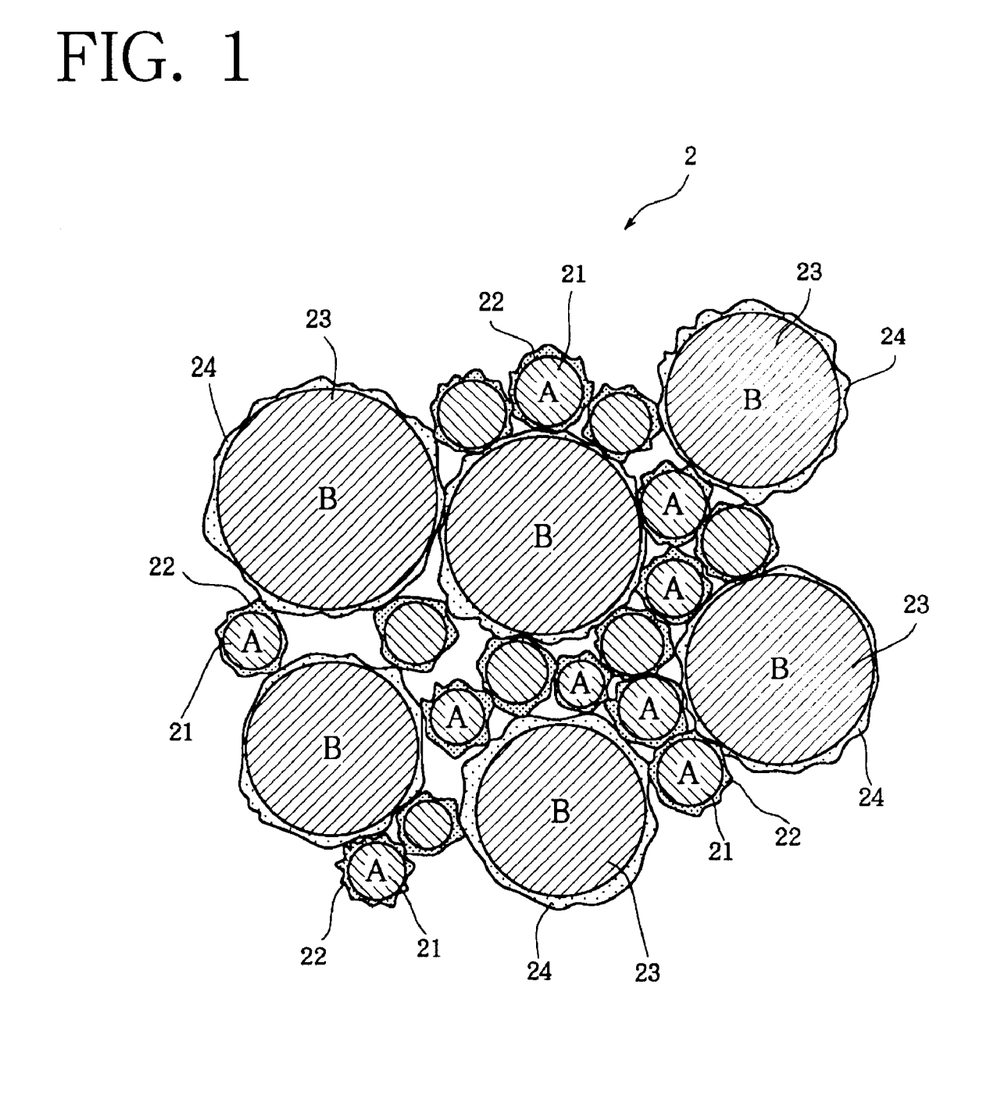
FIG. 1 is an enlarged schematic view in section showing an active material layer of a hydrogen absorbing alloy electrode embodying the present invention.

With reference to FIG. 1, the hydrogen absorbing alloy electrode of the present invention has an active substance layer 2 which is in the form of a mixture of a first hydrogen absorbing alloy powder A having a surface layer 22 formed on the surfaces of hydrogen absorbing alloy particles 21 and containing metallic copper or a copper oxide (hereinafter referred to as a "copper-coated hydrogen absorbing alloy powder A") and a second hydrogen absorbing alloy powder B having a surface layer 24 formed on the surfaces of hydrogen absorbing alloy particles 23 and containing metallic cobalt or a cobalt oxide (hereinafter referred to as a "cobalt-coated hydrogen absorbing alloy powder B").

The copper-coated hydrogen absorbing alloy powder A smaller than the cobalt-coated hydrogen absorbing alloy powder B in particle size is present in the interstices between the particles of the powder B in intimate with the particles to achieve a high fractional solids content.

The mode for the embodiment of the present invention will be described below in detail.

EXAMPLE 1

(Preparation of Hydrogen Absorbing Alloy and Hydrogen Absorbing Alloy Powders)

A Mm, and Ni, Co, Al and Mn each of which is a single metal having a purity of 99.9% were mixed together in a predetermined molar ratio, melted in an arc melting furnace having an argon atmosphere and thereafter spontaneously cooled to prepare a hydrogen absorbing alloy represented by the composition formula $MmNi_{3.1}Co_{1.0}Al_{0.3}Mn_{0.6}$ and having a crystal structure of the $CaCu_5$ type.

The ingot of the hydrogen absorbing alloy prepared by the above method was mechanically pulverized in an argon atmosphere to obtain a hydrogen absorbing alloy powder (referred to as alloy P1 below) with a mean particle size of 30 $\mu$m and a hydrogen absorbing alloy powder (referred to as alloy P2 below) with a mean particle size of 60 $\mu$m.

(The Surface Treatment of a Hydrogen Absorbing Powder)

To an aqueous hydrochloric acid solution was added a copper chloride ($CuCl_2$) in an amount of 3.0 wt. % based on the hydrogen absorbing alloy to be immersed in the solution later, and the resulting solution was adjusted to a pH value of 1.0 to prepare a treating solution (acid solution). The alloy P1 was immersed in the treating solution with stirring for 15 minutes, then filtered off under suction, thereafter washed with water and dried to obtain a copper-coated hydrogen absorbing alloy powder A.

To an aqueous hydrochloric acid solution was added a cobalt chloride ($CoCl_2$) in an amount of 3.0 wt. % based on the hydrogen absorbing alloy to be immersed in the solution later, and the resulting solution was adjusted to a pH value of 1.0 to prepare a treating solution (acid solution). The alloy P2 was immersed in the treating solution with stirring for 15 minutes, then filtered off under suction, thereafter washed with water and dried to obtain a cobalt-coated hydrogen absorbing alloy powder B.

(Preparation of Electrodes)

The copper-coated hydrogen absorbing alloy powder A and the cobalt-coated hydrogen absorbing alloy powder B thus surface-treated were mixed together in a ratio by weight of 1:9 to obtain a negative electrode active substance. 100 parts by weight of the active substance and 20 parts by weight of an aqueous solution of 5 wt. % of polyethylene oxide serving as a binder were mixed together into a paste. The paste was applied to opposite surfaces of a core comprising a nickel-plated punched metal sheet, dried at room temperature and thereafter cut to a specified size to prepare a negative electrode.

A known sintered nickel electrode was used as a positive electrode.

(Fabrication of Nickel-metal Hydride Battery)

A nickel-metal hydride battery [Sample No. 1] of size AA and the positive electrode predominant type was fabricated using the above positive electrode and negative electrode, a separator of alkali-resistant non-woven fabric and an electrolyte comprising 30 wt. % of potassium hydroxide.

Figure 2:
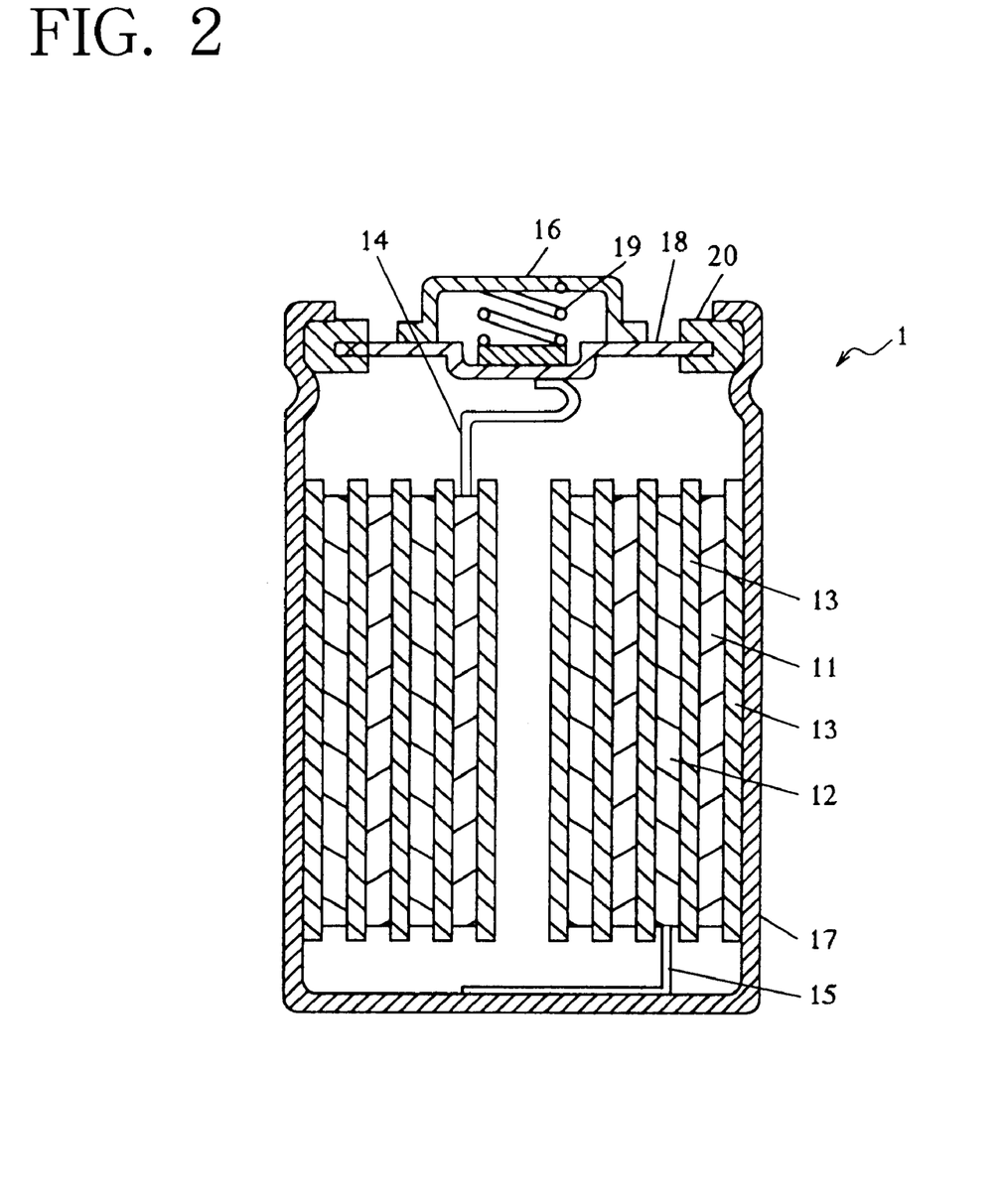
FIG. 2 is a sectional view showing a nickel-metal hydride battery prepared from a hydrogen absorbing alloy electrode embodying the present invention.

FIG. 2 shows a nickel-metal hydride battery 1 wherein a hydrogen absorbing alloy electrode of the invention is used and which comprises a positive electrode 11, negative electrode 12, separator 13, positive electrode lead 14, negative electrode lead 15, positive electrode external terminal 16, negative electrode can 17, closure 18, etc. The positive electrode 11 and the negative electrode 12 are spirally wound up into a roll with the separator 13 interposed therebetween, and encased in the can 17. The positive electrode 11 is connected to the closure 18 by the positive electrode lead 14, and the negative electrode 12 to the can 17 by the negative electrode lead 15. An insulating packing 20 is provided at the joint between the negative electrode can 17 and the closure 18 to seal off the nickel-metal hydride battery 1. A coil spring 19 is provided between the external terminal 16 and the closure 18 so that when the battery internal pressure builds up abnormally, the spring is compressed to release a gas from inside the battery to the atmosphere.

EXAMPLE 2

To an aqueous hydrochloric acid solution was added a copper chloride ($CuCl_2$) in an amount of 3.0 wt. % based on the hydrogen absorbing alloy to be immersed in the solution later, and the resulting solution was adjusted to a pH value of 1.0 to prepare a treating solution. The alloy P2 was immersed in the treating solution with stirring for 15 minutes, then filtered off under suction, thereafter washed with water and dried to obtain a copper-coated hydrogen absorbing alloy powder A.

To an aqueous hydrochloric acid solution was added a cobalt chloride ($CoCl_2$) in an amount of 3.0 wt. % based on the hydrogen absorbing alloy to be immersed in the solution later, and the resulting solution was adjusted to a pH value of 1.0 to prepare a treating solution. The alloy P1 was immersed in the treating solution with stirring for 15 minutes, then filtered off under suction, thereafter washed with water and dried to obtain a cobalt-coated hydrogen absorbing alloy powder B.

A nickel-metal hydride battery [Sample No. 2] according to the invention was fabricated in the same manner as in Example 1 with the exception of using a negative electrode active substance prepared by mixing together the copper-coated hydrogen absorbing alloy powder A and the cobalt-coated hydrogen absorbing alloy powder B in a ratio of 1:9 by weight.

EXAMPLE 1 and 3–7

In the same manner as in Example 1, a copper-coated hydrogen absorbing alloy powder A and a cobalt-coated hydrogen absorbing alloy powder B were prepared.

Six kinds of nickel-metal hydride batteries [Sample Nos. 1' and 3–7] according to the invention were fabricated in the same manner as in Example 1 with the exception of using a negative electrode active substance prepared by mixing together the copper-coated hydrogen absorbing alloy powder A and the cobalt-coated hydrogen absorbing alloy powder B in a ratio of 1:19, 2:1, 3:2, 1:1, 2:3 or 1:4 by weight.

EXAMPLES 8–13

To an aqueous hydrochloric acid solution was added a copper chloride ($CuCl_2$) in an amount of 3.0 wt. % based on the hydrogen absorbing alloy to be immersed in the solution later, and the resulting solution was adjusted to a pH value of 0.5 to prepare a treating solution. The alloy P1 was immersed in the treating solution with stirring for 15 minutes, then filtered off under suction, thereafter washed with water and dried to obtain a copper-coated hydrogen absorbing alloy powder A.

To an aqueous hydrochloric acid solution was added a cobalt chloride ($CoCl_2$) in an amount of 3.0 wt. % based on the hydrogen absorbing alloy to be immersed in the solution later, and the resulting solution was adjusted to a pH value of 0.5, 0.7, 1.0, 1.5, 2.0 or 2.5 to prepare six kinds of treating solutions. The alloy P2 was immersed in the six kinds of treating solutions with stirring for 15 minutes, then filtered off under suction, thereafter washed with water and dried to obtain six kinds of cobalt-coated hydrogen absorbing alloy powders B.

Six kinds of nickel-metal hydride batteries [Sample Nos. 8–13] according to the invention were fabricated in the same manner as in Example 1 with the exception of using a negative electrode active substance prepared by mixing together the copper-coated hydrogen absorbing alloy powder A and each of the cobalt-coated hydrogen absorbing alloy powders B in a ratio by weight of 1:9.

EXAMPLES 14–19

To an aqueous hydrochloric acid solution was added a copper chloride (CuCl$_2$) in an amount of 3.0 wt. % based on the hydrogen absorbing alloy to be immersed in the solution later, and the resulting solution was adjusted to a pH value of 0.7 to prepare a treating solution. The alloy P1 was immersed in the treating solution with stirring for 15 minutes, then filtered off under suction, thereafter washed with water and dried to obtain a copper-coated hydrogen absorbing alloy powder A.

To an aqueous hydrochloric acid solution was added a cobalt chloride (CoCl$_2$) in an amount of 3.0 wt. % based on the hydrogen absorbing alloy to be immersed in the solution later, and the resulting solution was adjusted to a pH value of 0.5, 0.7, 1.0, 1.5, 2.0 or 2.5 to prepare six kinds of treating solutions. The alloy P2 was immersed in these six kinds of treating solutions with stirring for 15 minutes, then filtered off under suction, thereafter washed with water and dried to obtain six kinds of cobalt-coated hydrogen absorbing alloy powders B.

Six kinds of nickel-metal hydride batteries [Sample Nos. 14–19] according to the invention were fabricated in the same manner as in Example 1 with the exception of using a negative electrode active substance prepared by mixing together the copper-coated hydrogen absorbing alloy powder A and each of the cobalt-coated hydrogen absorbing alloy powders B in a ratio of 1:9 by weight.

EXAMPLES 20–24

To an aqueous hydrochloric acid solution was added a copper chloride (CuCl$_2$) in an amount of 3.0 wt. % based on the hydrogen absorbing alloy to be immersed in the solution later, and the resulting solution was adjusted to a pH value of 1.0 to prepare a treating solution. The alloy P1 was immersed in the treating solution with stirring for 15 minutes, then filtered off under suction, thereafter washed with water and dried to obtain a copper-coated hydrogen absorbing alloy powder.

To an aqueous hydrochloric acid solution was added a cobalt chloride (CoCl$_2$) in an amount of 3.0 wt. % based on the hydrogen absorbing alloy to be immersed in the solution later, and the resulting solution was adjusted to a pH value of 0.5, 0.7, 1.5, 2.0 or 2.5 to prepare five kinds of treating solutions. The alloy P2 was immersed in these five kinds of treating solutions with stirring for 15 minutes, then filtered off under suction, thereafter washed with water and dried to obtain five kinds of cobalt-coated hydrogen absorbing alloy powders B.

Five kinds of nickel-metal hydride batteries [Sample Nos. 20–24] according to the invention were fabricated in the same manner as in Example 1 with the exception of using a negative electrode active substance prepared by mixing together the copper-coated hydrogen absorbing alloy powder A and each of the cobalt-coated hydrogen absorbing alloy powders B in a ratio of 1:9 by weight.

EXAMPLES 25–30

To an aqueous hydrochloric acid solution was added a copper chloride (CuCl$_2$) in an amount of 3.0 wt. % based on the hydrogen absorbing alloy to be immersed in the solution later, and the resulting solution was adjusted to a pH value of 1.5 to prepare a treating solution. The alloy P1 was immersed in the treating solution with stirring for 15 minutes, then filtered off under suction, thereafter washed with water and dried to obtain a copper-coated hydrogen absorbing alloy powder A.

To an aqueous hydrochloric acid solution was added a cobalt chloride (CoCl$_2$) in an amount of 3.0 wt. % based on the hydrogen absorbing alloy to be immersed in the solution later, and the resulting solution was adjusted to a pH value of 0.5, 0.7, 1.0, 1.5, 2.0 or 2.5 to prepare six kinds of treating solutions. The alloy P2 was immersed in these six kinds of treating solutions with stirring for 15 minutes, then filtered off under suction, thereafter washed with water and dried to obtain six kinds of cobalt-coated hydrogen absorbing alloy powders B.

Six kinds of nickel-metal hydride batteries [Sample Nos. 25–30] according to the invention were fabricated in the same manner as in Example 1 with the exception of using a negative electrode active substance prepared by mixing together the copper-coated hydrogen absorbing alloy powder A and each of the cobalt-coated hydrogen absorbing alloy powders B in a ratio by weight of 1:9.

EXAMPLES 31–36

To an aqueous hydrochloric acid solution was added a copper chloride (CuCl$_2$) in an amount of 3.0 wt. % based on the hydrogen absorbing alloy to be immersed in the solution later, and the resulting solution was adjusted to a pH value of 2.0 to prepare a treating solution. The alloy P1 was immersed in the treating solution with stirring for 15 minutes, then filtered off under suction, thereafter washed with water and dried to obtain a copper-coated hydrogen absorbing alloy powder A.

To an aqueous hydrochloric acid solution was added a cobalt chloride (CoCl$_2$) in an amount of 3.0 wt. % based on the hydrogen absorbing alloy to be immersed in the solution later, and the resulting solution was adjusted to a pH value of 0.5, 0.7, 1.0, 1.5, 2.0 or 2.5 to prepare six kinds of treating solutions. The alloy P2 was immersed in these six kinds of treating solutions with stirring for 15 minutes, then filtered off under suction, thereafter washed with water and dried to obtain six kinds of cobalt-coated hydrogen absorbing alloy powders B.

Six kinds of nickel-metal hydride batteries [Sample Nos. 31–36] according to the invention were fabricated in the same manner as in Example 1 with the exception of using a negative electrode active substance prepared by mixing together the copper-coated hydrogen absorbing alloy powder A and each of the cobalt-coated hydrogen absorbing alloy powders B in a ratio of 1:9 by weight.

EXAMPLES 37–42

To an aqueous hydrochloric acid solution was added a copper chloride (CuCl$_2$) in an amount of 3.0 wt. % based on the hydrogen absorbing alloy to be immersed in the solution later, and the resulting solution was adjusted to a pH value of 2.5 to prepare a treating solution. The alloy P1 was immersed in the treating solution with stirring for 15 minutes, then filtered off under suction, thereafter washed with water and dried to obtain a copper-coated hydrogen absorbing alloy powder A.

To an aqueous hydrochloric acid solution was added a cobalt chloride (CoCl$_2$) in an amount of 3.0 wt. % based on the hydrogen absorbing alloy to be immersed in the solution later, and the resulting solution was adjusted to a pH value of 0.5, 0.7, 1.0, 1.5, 2.0 or 2.5 to prepare six kinds of treating solutions. The alloy P2 was immersed in these six kinds of treating solutions with stirring for 15 minutes, then filtered off under suction, thereafter washed with water and dried to obtain six kinds of cobalt-coated hydrogen absorbing alloy powders B.

Six kinds of nickel-metal hydride batteries [Sample Nos. 37–42] according to the invention were fabricated in the same manner as in Example 1 with the exception of using a negative electrode active substance prepared by mixing together the copper-coated hydrogen absorbing alloy powder A and each of the cobalt-coated hydrogen absorbing alloy powders B in a ratio of 1:9 by weight.

EXAMPLES 43–47

To an aqueous hydrochloric acid solution was added a copper chloride ($CuCl_2$) in an amount of 0.5 wt. % based on the hydrogen absorbing alloy to be immersed in the solution later, and the resulting solution was adjusted to a pH value of 1.0 to prepare a treating solution. The alloy P1 was immersed in the treating solution with stirring for 15 minutes, then filtered off under suction, thereafter washed with water and dried to obtain a copper-coated hydrogen absorbing alloy powder A.

To an aqueous hydrochloric acid solution was added a cobalt chloride ($CoCl_2$) in an amount of 0.5, 1.0, 3.0, 5.0 or 7.0 wt. % based on the hydrogen absorbing alloy to be immersed in the solution later, and the resulting solutions were adjusted to a pH value of 1.0 to prepare five kinds of treating solutions. The alloy P2 was immersed in these treating solutions with stirring for 15 minutes, then filtered off under suction, thereafter washed with water and dried to obtain five kinds of cobalt-coated hydrogen absorbing alloy powders B.

Five kinds of nickel-metal hydride batteries [Sample Nos. 43–47] according to the invention were fabricated in the same manner as in Example 1 with the exception of using a negative electrode active substance prepared by mixing together the copper-coated hydrogen absorbing alloy powder A and each of the cobalt-coated hydrogen absorbing alloy powders B in a ratio of 1:9 by weight.

EXAMPLES 48–52

To an aqueous hydrochloric acid solution was added a copper chloride ($CuCl_2$) in an amount of 1.0 wt. % based on the hydrogen absorbing alloy to be immersed in the solution later, and the resulting solution was adjusted to a pH value of 1.0 to prepare a treating solution. The alloy P1 was immersed in the treating solution with stirring for 15 minutes, then filtered off under suction, thereafter washed with water and dried to obtain a copper-coated hydrogen absorbing alloy powder A.

To an aqueous hydrochloric acid solution was added a cobalt chloride ($CoCl_2$) in an amount of 0.5, 1.0, 3.0, 5.0 or 7.0 wt. % based on the hydrogen absorbing alloy to be immersed in the solution later, and the resulting solutions were adjusted to a pH value of 1.0 to prepare five kinds of treating solutions. The alloy P2 was immersed in these treating solutions with stirring for 15 minutes, then filtered off under suction, thereafter washed with water and dried to obtain five kinds of cobalt-coated hydrogen absorbing alloy powders B.

Five kinds of nickel-metal hydride batteries [Sample Nos. 48–52] according to the invention were fabricated in the same manner as in Example 1 with the exception of using a negative electrode active substance prepared by mixing together the copper-coated hydrogen absorbing alloy powder A and each of the cobalt-coated hydrogen absorbing alloy powders B in a ratio of 1:9 by weight.

EXAMPLES 53–56

To an aqueous hydrochloric acid solution was added a copper chloride ($CuCl_2$) in an amount of 3.0 wt. % based on the hydrogen absorbing alloy to be immersed in the solution later, and the resulting solution was adjusted to a pH value of 1.0 to prepare a treating solution. The alloy P1 was immersed in the treating solution with stirring for 15 minutes, then filtered off under suction, thereafter washed with water and dried to obtain a copper-coated hydrogen absorbing alloy powder A.

To an aqueous hydrochloric acid solution was added a cobalt chloride ($CoCl_2$) in an amount of 0.5, 1.0, 5.0 or 7.0 wt. % based on the hydrogen absorbing alloy to be immersed in the solution later, and the resulting solutions were adjusted to a pH value of 1.0 to prepare four kinds of treating solutions. The alloy P2 was immersed in these treating solutions with stirring for 15 minutes, then filtered off under suction, thereafter washed with water and dried to obtain four kinds of cobalt-coated hydrogen absorbing alloy powders B.

Four kinds of nickel-metal hydride batteries [Sample Nos. 53–56] according to the invention were fabricated in the same manner as in Example 1 with the exception of using a negative electrode active substance prepared by mixing together the copper-coated hydrogen absorbing alloy powder A and each of the cobalt-coated hydrogen absorbing alloy powders B in a ratio of 1:9 by weight.

EXAMPLES 57–61

To an aqueous hydrochloric acid solution was added a copper chloride ($CuCl_2$) in an amount of 5.0 wt. % based on the hydrogen absorbing alloy to be immersed in the solution later, and the resulting solution was adjusted to a pH value of 1.0 to prepare a treating solution. The alloy P1 was immersed in the treating solution with stirring for 15 minutes, then filtered off under suction, thereafter washed with water and dried to obtain a copper-coated hydrogen absorbing alloy powder A.

To an aqueous hydrochloric acid solution was added a cobalt chloride ($CoCl_2$) in an amount of 0.5, 1.0, 3.0, 5.0 or 7.0 wt. % based on the hydrogen absorbing alloy to be immersed in the solution later, and the resulting solutions were adjusted to a pH value of 1.0 to prepare five kinds of treating solutions. The alloy P2 was immersed in these treating solutions with stirring for 15 minutes, then filtered off under suction, thereafter washed with water and dried to obtain six kinds of cobalt-coated hydrogen absorbing alloy powders B.

Five kinds of nickel-metal hydride batteries [Sample Nos. 57–61] according to the invention were fabricated in the same manner as in Example 1 with the exception of using a negative electrode active substance prepared by mixing together the copper-coated hydrogen absorbing alloy powder A and each of the cobalt-coated hydrogen absorbing alloy powders B in a ratio of 1:9 by weight.

EXAMPLES 62–66

To an aqueous hydrochloric acid solution was added a copper chloride ($CuCl_2$) in an amount of 7.0 wt. % based on the hydrogen absorbing alloy to be immersed in the solution later, and the resulting solution was adjusted to a pH value of 1.0 to prepare a treating solution. The alloy P1 was immersed in the treating solution with stirring for 15 minutes, then filtered off under suction, thereafter washed with water and dried to obtain a copper-coated hydrogen absorbing alloy powder A To an aqueous hydrochloric acid solution was added a cobalt chloride ($CoCl_2$) in an amount of 0.5, 1.0, 3.0, 5.0 or 7.0 wt. % based on the hydrogen absorbing alloy to be immersed in the solution later, and the resulting solutions were adjusted to a pH value of 1.0 to prepare five kinds of treating solutions. The alloy P2 was immersed in these treating solutions with stirring for 15 minutes, then filtered off under suction, thereafter washed with water and dried to obtain five kinds of cobalt-coated hydrogen absorbing alloy powders B.

Five kinds of nickel-metal hydride batteries [Sample Nos. 62–66] according to the invention were fabricated in the same manner as in Example 1 with the exception of using a negative electrode active substance prepared by mixing together the copper-coated hydrogen absorbing alloy powder A and each of the cobalt-coated hydrogen absorbing alloy powders B in a ratio of 1:9 by weight.

EXAMPLES 67–71

To an aqueous hydrochloric acid solution was added a copper chloride ($CuCl_2$) in an amount of 3.0 wt. % based on the hydrogen absorbing alloy to be immersed in the solution later, and the resulting solution was adjusted to a pH value of 1.0 to prepare a treating solution. The alloy P1 was immersed in the treating solution with stirring for 15 minutes, then filtered off under suction, thereafter washed with water and dried to obtain a copper-coated hydrogen absorbing alloy powder A.

To an aqueous hydrochloric acid solution was added a cobalt hydroxide ($Co(OH)_2$) in an amount of 0.1, 0.3, 0.5, 1.0 or 1.5 wt. % based on the hydrogen absorbing alloy to be immersed in the solution later, and the resulting solution was adjusted to a pH value of 1.0 to prepare five kinds of treating solutions. The alloy P2 was immersed in these treating solutions with stirring for 15 minutes, then filtered off under suction, thereafter washed with water and dried to obtain five kinds of cobalt-coated hydrogen absorbing alloy powders B.

Five kinds of nickel-metal hydride batteries [Sample Nos. 67–71] according to the invention were fabricated in the same manner as in Example 1 with the exception of using a negative electrode active substance prepared by mixing together the copper-coated hydrogen absorbing alloy powder A and each of the cobalt-coated hydrogen absorbing alloy powders B in a ratio of 1:9 by weight.

EXAMPLES 72–142

A hydrogen absorbing alloy was prepared in the same manner as in Example 1 and made into a hydrogen absorbing alloy powder up to 30 μm in particle size (hereinafter referred to as the "alloy P3") and a hydrogen absorbing alloy powder 30 μm to 60 μm in particle size (hereinafter referred to as the "alloy P4") by the gas atomization process.

Seventy-one kinds of nickel-metal hydride batteries [Sample Nos. 72–142] according to the invention and corresponding to those of Examples 1 to 71, respectively, were fabricated in the same manner as in these examples with the exception of using the alloy P3 in place of the alloy P1 and the alloy P4 in place of the alloy P2.

Comparative Example 1

An aqueous hydrochloric acid solution containing no copper chloride ($CuCl_2$) was adjusted to a pH value of 1.0 to prepare a treating solution, in which the alloy P1 was immersed with stirring for 15 minutes, then filtered off under suction, thereafter washed with water and dried to obtain a hydrogen absorbing alloy powder. A comparative battery [Sample No. C1] was fabricated in the same manner as in Example 1 with the exception of using a negative electrode active substance prepared by mixing together this hydrogen absorbing alloy powder and a nickel powder serving as a conductive agent in a ratio of 9:1 by weight.

Comparative Example 2

To an aqueous hydrochloric acid solution was added a cobalt chloride ($CoCl_2$) in an amount of 3.0 wt. % based on the hydrogen absorbing alloy to be immersed in the solution later, and the resulting solution was adjusted to a pH value of 1.0 to prepare a treating solution. The alloy P2 was immersed in this treating solution with stirring for 15 minutes, then filtered off under suction, thereafter washed with water and dried to obtain a cobalt-coated hydrogen absorbing alloy powder B. A comparative battery [Sample No. C2] was fabricated in the same manner as in Example 1 with the exception of using a negative electrode active substance prepared by mixing together this cobalt-coated hydrogen absorbing alloy powder B and a nickel powder serving as a conductive agent in a ratio of 9:1 by weight.

Comparative Example 3

To an aqueous hydrochloric acid solution was added a copper chloride ($CuCl_2$) in an amount of 3.0 wt. % based on the hydrogen absorbing alloy to be immersed in the solution later, and the resulting solution was adjusted to a pH value of 1.0 to prepare a treating solution. The alloy P1 was immersed in this treating solution with stirring for 15 minutes, then filtered off under suction, thereafter washed with water and dried to obtain a copper-coated hydrogen absorbing alloy powder A. A comparative battery [Sample No. C3] was fabricated in the same manner as in Example 1 with the exception of using a negative electrode active substance prepared by mixing together this copper-coated hydrogen absorbing alloy powder A and a nickel powder serving as a conductive agent in a ratio of 9:1 by weight.

Comparative Examples 4–6

Three kinds of comparative batteries [Sample Nos. C4–C6] were fabricated in the same manner as in Comparative Examples 1 to 3 with the exception of using the alloy P3 in place of the alloy P1 and the alloy P4 instead of the alloy P2.

Charge-Discharge Cycle Test

The cycle of charging the battery at a current value of 1.5 C for 0.8 hour and thereafter discharging the battery at a current value of 1.5 C to 1.0 V was repeated at room temperature. The battery was checked for discharge capacity (mAh) in the 500th cycle.

Battery Internal Pressure Characteristic

The battery was charged at a current value of 1.0 C at room temperature and checked for internal pressure to measure the charging time taken for the internal pressure to reach 10 kgf/cm$^2$.

High-Rate Discharge Characteristics

The battery was charged at 0.2 C for 6 hours and thereafter discharged at a current value of 6.0 C to 1.0 V to determine the discharge capacity (mAh).

Table 1 shows the experimental result achieved with use of the copper-coated hydrogen absorbing alloy powder A and the cobalt-coated hydrogen absorbing alloy powder B which were prepared from a mechanically pulverized hydrogen absorbing alloy to substantiate the effect of the particles sizes of the powders.

TABLE 1

| SAMPLE NO. | ALLOY A/ ALLOY B (CONDUCTIVE AGENT/ ALLOY) | CAPACITY AFTER 500 CYCLES mAh | INTERNAL PRESSURE CHARACTERISTICS min | HIGH-RATE DISCHARGE CHARACTERISTICS mAh |
|---|---|---|---|---|
| 1  | 1/9   | 860 | 145 | 820 |
| 2  | 1/9   | 840 | 135 | 810 |
| C1 | (1/9) | 720 | 110 | 790 |
| C2 | (1/9) | 800 | 135 | 800 |
| C3 | (1/9) | 760 | 115 | 805 |

With reference to Table 1, the nickel-metal hydride batteries wherein the hydrogen absorbing alloy electrode of the invention is used are found to be superior with respect to all of the cycle characteristics, internal pressure characteristics and high-rate discharge characteristics when the comparative battery [Sample No. C1] wherein the conventional hydrogen absorbing alloy having no metallic coating is used and the comparative batteries [Sample Nos. C2 and C3] wherein one of the copper-coated hydrogen absorbing alloy powder A and the cobalt-coated hydrogen absorbing alloy powder B is used are compared with the nickel-metal hydride batteries [samples Nos. 1 and 2] wherein these powders A and B are used for the hydrogen absorbing alloy electrode according to the invention.

Further a comparison between the nickel-metal hydride batteries [Sample Nos. 1 and 2] wherein the hydrogen absorbing alloy electrode of the invention is used reveals that the cobalt-coated hydrogen absorbing alloy powder B is preferably greater than the copper-coated hydrogen absorbing alloy powder A in particle size when to be used in combination therewith for hydrogen absorbing alloy electrodes of the invention.

Table 2 shows the experimental result achieved as to the weight ratio between the copper-coated hydrogen absorbing alloy powder A and the cobalt-coated hydrogen absorbing alloy powder B to be mixed together in preparing hydrogen absorbing alloy electrodes of the invention.

TABLE 2

| SAMPLE NO. | ALLOY A/ ALLOY B (CONDUCTIVE AGENT/ ALLOY) | CAPACITY AFTER 500 CYCLES mAh | INTERNAL PRESSURE CHARACTERISTICS min | HIGH-RATE DISCHARGE CHARACTERISTICS mAh |
|---|---|---|---|---|
| 1  | 1/9   | 850 | 145 | 820 |
| 1' | 1/19  | 860 | 145 | 820 |
| 3  | 2/1   | 810 | 135 | 800 |
| 4  | 3/2   | 810 | 135 | 800 |
| 5  | 1/1   | 840 | 135 | 815 |
| 6  | 2/3   | 845 | 135 | 820 |
| 7  | 1/4   | 850 | 140 | 825 |
| C1 | (1/9) | 720 | 11o | 790 |
| C2 | (1/9) | 800 | 135 | 800 |
| C3 | (1/9) | 760 | 115 | 805 |

Table 2 reveals that as compared with the comparative batteries [Sample Nos. C1–C3], the nickel-metal hydride batteries [Sample Nos. 1, 1', 5–7] of the invention wherein the cobalt-coated hydrogen absorbing alloy powder B is equivalent to or greater than the copper-coated hydrogen absorbing alloy powder A in content by weight are greatly improved in all of the discharge capacity after 500 cycles, internal pressure characteristics and high-rate discharge characteristics. It is especially desirable that the copper-coated hydrogen absorbing alloy powder A be at least 5 wt. % to not greater than 50 wt. %. Further a comparison of the batteries of the invention with the comparative batteries [Sample Nos. C2 and C3] suggests that the advantage of the invention is attributable largely to the synergistic effect due to the presence of both the copper-coated hydrogen absorbing alloy powder and the cobalt-coated hydrogen absorbing alloy powder.

Table 3 shows the experimental result achieved with respect to the pH of the treating solutions used in the oxide film removing steps for preparing the copper-coated hydrogen absorbing alloy powder A and the cobalt-coated hydrogen absorbing alloy powder B for hydrogen absorbing alloy electrodes of the invention.

TABLE 3

| SAMPLE NO. | ALLOY A TREATING SOLN. pH | ALLOY B TREATING SOLN. pH | CAPACITY AFTER 500 CYCLES mAh | INTERNAL PRESSURE CHARACTERSTICS min | HIGH-RATE DISCHARGE CHARACTERSTICS mAh |
|---|---|---|---|---|---|
| 8  | 0.5 | 0.5 | 800 | 135 | 805 |
| 9  | 0.5 | 0.7 | 810 | 140 | 805 |
| 10 | 0.5 | 1.0 | 810 | 140 | 805 |
| 11 | 0.5 | 1.5 | 810 | 140 | 805 |
| 12 | 0.5 | 2.0 | 810 | 140 | 805 |
| 13 | 0.5 | 2.5 | 800 | 135 | 805 |
| 14 | 0.7 | 0.5 | 815 | 135 | 815 |
| 15 | 0.7 | 0.7 | 855 | 145 | 820 |
| 16 | 0.7 | 1.0 | 860 | 150 | 825 |
| 17 | 0.7 | 1.5 | 860 | 145 | 820 |
| 18 | 0.7 | 2.0 | 850 | 145 | 820 |
| 19 | 0.7 | 2.5 | 815 | 135 | 815 |
| 20 | 1.0 | 0.5 | 815 | 135 | 810 |
| 21 | 1.0 | 0.7 | 860 | 145 | 820 |
| 1  | 1.0 | 1.0 | 860 | 145 | 825 |
| 22 | 1.0 | 1.5 | 860 | 145 | 825 |
| 23 | 1.0 | 2.0 | 855 | 145 | 820 |
| 24 | 1.0 | 2.5 | 815 | 135 | 815 |
| 25 | 1.5 | 0.5 | 820 | 135 | 810 |
| 26 | 1.5 | 0.7 | 855 | 145 | 820 |
| 27 | 1.5 | 1.0 | 860 | 145 | 825 |
| 28 | 1.5 | 1.5 | 855 | 145 | 820 |
| 29 | 1.5 | 2.0 | 855 | 145 | 820 |
| 30 | 1.5 | 2.5 | 820 | 135 | 810 |
| 31 | 2.0 | 0.5 | 815 | 135 | 810 |
| 32 | 2.0 | 0.7 | 850 | 140 | 820 |
| 33 | 2.0 | 1.0 | 860 | 145 | 820 |
| 34 | 2.0 | 1.5 | 845 | 140 | 820 |
| 35 | 2.0 | 2.0 | 845 | 140 | 810 |
| 36 | 2.0 | 2.5 | 810 | 135 | 800 |
| 37 | 2.5 | 0.5 | 810 | 135 | 800 |
| 38 | 2.5 | 0.7 | 810 | 135 | 810 |
| 39 | 2.5 | 1.0 | 810 | 135 | 810 |
| 40 | 2.5 | 1.5 | 815 | 135 | 810 |
| 41 | 2.5 | 2.0 | 815 | 135 | 810 |
| 42 | 2.5 | 2.5 | 810 | 135 | 800 |

Table 3 reveals that the nickel-metal hydride batteries [Sample Nos. 1, 15–18, 21–23, 26–29 and 32–35] of the invention are greatly improved in battery characteristics. This indicates that the pH of the treating solutions suitable for removing the oxide film is in the range of 0.7 to 2.0.

Tables 4 and 5 show the experimental result obtained with respect to the amount of metallic salts added to the treating solutions.

TABLE 4

| SAMPLE NO. | ALLOY A AMOUNT OF CuCl2 | ALLOY B AMOUNT OF CoCl2 | CAPACITY AFTER 500 CYCLES mAh | INTERNAL PRESSURE CHARACTERSTICS min | HIGH-RATE DISCHARGE CHARACTERSTICS mAh |
|---|---|---|---|---|---|
| 43 | 0.5 | 0.5 | 810 | 135 | 800 |
| 44 | 0.5 | 1.0 | 815 | 140 | 800 |
| 45 | 0.5 | 3.0 | 815 | 140 | 800 |
| 46 | 0.5 | 5.0 | 815 | 140 | 800 |
| 47 | 0.5 | 7.0 | 810 | 135 | 800 |
| 48 | 1.0 | 0.5 | 815 | 135 | 805 |
| 49 | 1.0 | 1.0 | 860 | 145 | 820 |
| 50 | 1.0 | 3.0 | 865 | 145 | 825 |
| 51 | 1.0 | 5.0 | 860 | 145 | 820 |
| 52 | 1.0 | 7.0 | 810 | 135 | 810 |
| 53 | 3.0 | 0.5 | 815 | 135 | 810 |
| 54 | 3.0 | 1.0 | 855 | 145 | 825 |
| 1 | 3.0 | 3.0 | 860 | 145 | 820 |
| 55 | 3.0 | 5.0 | 860 | 145 | 820 |
| 56 | 3.0 | 7.0 | 810 | 135 | 810 |
| 57 | 5.0 | 0.5 | 810 | 135 | 810 |
| 58 | 5.0 | 1.0 | 850 | 145 | 820 |
| 59 | 5.0 | 3.0 | 855 | 145 | 825 |
| 60 | 5.0 | 5.0 | 860 | 145 | 820 |
| 61 | 5.0 | 7.0 | 810 | 135 | 810 |
| 62 | 7.0 | 0.5 | 815 | 135 | 805 |
| 63 | 7.0 | 1.0 | 815 | 135 | 805 |
| 64 | 7.0 | 3.0 | 815 | 135 | 805 |
| 65 | 7.0 | 5.0 | 815 | 135 | 805 |
| 66 | 7.0 | 7.0 | 810 | 135 | 800 |

TABLE 5

| SAMPLE NO. | ALLOY A AMOUNT OF CuCl2 | ALLOY B AMOUNT OF Co(OH)2 | CAPACITY AFTER 500 CYCLES mAh | INTERNAL PRESSURE CHARACTERSTICS min | HIGH-RATE DISCHARGE CHARACTERSTICS mAh |
|---|---|---|---|---|---|
| 67 | 3.0 | 0.1 | 810 | 135 | 810 |
| 68 | 3.0 | 0.3 | 855 | 145 | 825 |
| 69 | 3.0 | 0.5 | 860 | 145 | 825 |
| 70 | 3.0 | 1.0 | 850 | 145 | 820 |
| 71 | 3.0 | 1.5 | 810 | 135 | 810 |

As shown in Table 4, the nickel-metal hydride batteries [Sample Nos. 1, 49–51, 54, 55 and 58–60] of the invention are greatly improved in battery characteristics which batteries were obtained by using an acid solution containing a copper chloride ($CuCl_2$) amount of 1.0 to 5.0 wt. % based on the weight of the hydrogen absorbing alloy to be treated and an acid solution containing a cobalt chloride ($CoCl_2$) in an amount of 1.0 to 5.0 wt. % based on the weight of the hydrogen absorbing alloy to be treated in forming a metallic coating on each hydrogen absorbing alloy, and using the resulting hydrogen absorbing alloy powders as active substances. To give an optimum thickness to the respective metallic coatings of the copper-coated hydrogen absorbing alloy powder A and cobalt-coated hydrogen absorbing alloy powder B, it is therefore suitable that the acid solutions contain 1.0 to 5.0 wt. % of copper chloride ($CuCl_2$) and 1.0 to 5.0 wt. % of cobalt chloride ($CoCl_2$), respectively, based on the weight of the hydrogen absorbing alloy.

Table 5 reveals that satisfactory battery characteristics are exhibited also by the nickel-metal hydride batteries [Sample Nos. 68–70] of the invention which were obtained by using a cobalt hydroxide ($CO(OH)_2$) in place of cobalt chloride ($COCl_2$) in preparing the cobalt-coated hydrogen absorbing alloy. Accordingly, the optimum amount of cobalt hydroxide ($CO(OH)_2$) to be incorporated into the acid solution is 0.3 to 1.0 wt. % based on the weight of the hydrogen absorbing alloy.

Further Tables 6 to 10 show the experimental result obtained by the nickel-metal hydride batteries fabricated in the same manner as above with the exception of using hydrogen absorbing alloy powders prepared by the gas atomization process as starting materials.

TABLE 6

| SAMPLE NO. | ALLOY A/ ALLOY B (CONDUCTIVE AGENT/ ALLOY) | CAPACITY AFTER 500 CYCLES mAh | INTERNAL PRESSURE CHARACTERISTICS min | HIGH-RATE DISCHARGE CHARACTERISTICS mAh |
|---|---|---|---|---|
| 72 | 1/9 | 860 | 145 | 825 |
| 73 | 1/9 | 845 | 140 | 815 |
| C4 | (1/9) | 725 | 105 | 800 |
| C5 | (1/9) | 795 | 125 | 800 |
| C6 | (1/9) | 755 | 120 | 805 |

TABLE 7

| SAMPLE NO. | ALLOY A/ ALLOY B (CONDUCTIVE AGENT/ ALLOY) | CAPACITY AFTER 500 CYCLES mAh | INTERNAL PRESSURE CHARACTERISTICS min | HIGH-RATE DISCHARGE CHARACTERISTICS mAh |
|---|---|---|---|---|
| 72 | 1/9 | 860 | 145 | 825 |
| 74 | 2/1 | 815 | 135 | 805 |
| 75 | 3/2 | 815 | 135 | 805 |
| 76 | 1/1 | 845 | 135 | 820 |
| 77 | 2/3 | 850 | 135 | 825 |
| 78 | 1/4 | 850 | 135 | 825 |
| C4 | (1/9) | 725 | 105 | 800 |
| C5 | (1/9) | 795 | 125 | 800 |
| C6 | (1/9) | 755 | 120 | 805 |

TABLE 8

| SAMPLE NO. | ALLOY A TREATING SOLN. pH | ALLOY B TREATING SOLN. pH | CAPACITY AFTER 500 CYCLES mAh | INTERNAL PRESSURE CHARACTERSTICS min | HIGH-RATE DISCHARGE CHARACTERSTICS mAh |
|---|---|---|---|---|---|
| 79 | 0.5 | 0.5 | 800 | 130 | 805 |
| 80 | 0.5 | 0.7 | 805 | 140 | 805 |
| 81 | 0.5 | 1.0 | 815 | 140 | 810 |
| 82 | 0.5 | 1.5 | 810 | 140 | 805 |
| 83 | 0.5 | 2.0 | 810 | 135 | 805 |
| 84 | 0.5 | 2.5 | 800 | 135 | 805 |
| 85 | 0.7 | 0.5 | 810 | 135 | 810 |
| 86 | 0.7 | 0.7 | 855 | 145 | 820 |
| 87 | 0.7 | 1.0 | 855 | 150 | 825 |
| 88 | 0.7 | 1.5 | 855 | 145 | 825 |
| 89 | 0.7 | 2.0 | 850 | 145 | 825 |
| 90 | 0.7 | 2.5 | 815 | 130 | 815 |
| 91 | 1.0 | 0.5 | 820 | 130 | 810 |
| 92 | 1.0 | 0.7 | 860 | 145 | 820 |
| 72 | 1.0 | 1.0 | 860 | 145 | 825 |
| 93 | 1.0 | 1.5 | 855 | 145 | 820 |
| 94 | 1.0 | 2.0 | 855 | 140 | 820 |
| 95 | 1.0 | 2.5 | 815 | 130 | 815 |
| 96 | 1.5 | 0.5 | 820 | 130 | 815 |
| 97 | 1.5 | 0.7 | 855 | 145 | 820 |

TABLE 8-continued

| SAMPLE NO. | ALLOY A TREATING SOLN. pH | ALLOY B TREATING SOLN. pH | CAPACITY AFTER 500 CYCLES mAh | INTERNAL PRESSURE CHARACTERSTICS min | HIGH-RATE DISCHARGE CHARACTERSTICS mAh |
|---|---|---|---|---|---|
| 98 | 1.5 | 1.0 | 855 | 150 | 825 |
| 99 | 1.5 | 1.5 | 855 | 150 | 820 |
| 100 | 1.5 | 2.0 | 850 | 145 | 820 |
| 101 | 1.5 | 2.5 | 815 | 135 | 815 |
| 102 | 2.0 | 0.5 | 815 | 135 | 815 |
| 103 | 2.0 | 0.7 | 850 | 140 | 820 |
| 104 | 2.0 | 1.0 | 855 | 145 | 825 |
| 105 | 2.0 | 1.5 | 845 | 140 | 820 |
| 106 | 2.0 | 2.0 | 845 | 140 | 820 |
| 107 | 2.0 | 2.5 | 810 | 135 | 800 |
| 108 | 2.5 | 0.5 | 810 | 130 | 805 |
| 109 | 2.5 | 0.7 | 810 | 135 | 805 |
| 110 | 2.5 | 1.0 | 810 | 130 | 810 |
| 111 | 2.5 | 1.5 | 815 | 130 | 805 |
| 112 | 2.5 | 2.0 | 810 | 130 | 805 |
| 113 | 2.5 | 2.5 | 810 | 130 | 800 |

TABLE 9

| SAMPLE NO. | ALLOY A AMOUNT OF CuCl2 | ALLOY B AMOUNT OF CoCl2 | CAPACITY AFTER 500 CYCLES mAh | INTERNAL PRESSURE CHARACTERSTICS min | HIGH-RATE DISCHARGE CHARACTERSTICS mAh |
|---|---|---|---|---|---|
| 114 | 0.5 | 0.5 | 810 | 130 | 800 |
| 115 | 0.5 | 1.0 | 815 | 135 | 805 |
| 116 | 0.5 | 3.0 | 815 | 140 | 805 |
| 117 | 0.5 | 5.0 | 815 | 135 | 805 |
| 118 | 0.5 | 7.0 | 810 | 130 | 805 |
| 119 | 1.0 | 0.5 | 810 | 135 | 805 |
| 120 | 1.0 | 1.0 | 860 | 140 | 825 |
| 121 | 1.0 | 3.0 | 865 | 145 | 825 |
| 122 | 1.0 | 5.0 | 860 | 145 | 825 |
| 123 | 1.0 | 7.0 | 815 | 130 | 810 |
| 124 | 3.0 | 0.5 | 815 | 130 | 810 |
| 125 | 3.0 | 1.0 | 860 | 145 | 825 |
| 72 | 3.0 | 3.0 | 860 | 145 | 825 |
| 126 | 3.0 | 5.0 | 860 | 145 | 820 |
| 127 | 3.0 | 7.0 | 815 | 130 | 805 |
| 128 | 5.0 | 0.5 | 810 | 130 | 805 |
| 129 | 5.0 | 1.0 | 850 | 145 | 825 |
| 130 | 5.0 | 3.0 | 855 | 150 | 825 |
| 131 | 5.0 | 5.0 | 855 | 145 | 820 |
| 132 | 5.0 | 7.0 | 815 | 130 | 810 |
| 133 | 7.0 | 0.5 | 810 | 130 | 810 |
| 134 | 7.0 | 1.0 | 815 | 130 | 810 |
| 135 | 7.0 | 3.0 | 810 | 130 | 810 |
| 136 | 7.0 | 5.0 | 810 | 135 | 810 |
| 137 | 7.0 | 7.0 | 805 | 130 | 805 |

TABLE 10

| SAMPLE NO. | ALLOY A AMOUNT OF CuCl2 | ALLOY B AMOUNT OF Co(OH)2 | CAPACITY AFTER 500 CYCLES mAh | INTERNAL PRESSURE CHARACTERSTICS min | HIGH-RATE DISCHARGE CHARACTERSTICS mAh |
|---|---|---|---|---|---|
| 138 | 3.0 | 0.1 | 815 | 135 | 815 |
| 139 | 3.0 | 0.3 | 850 | 150 | 825 |
| 140 | 3.0 | 0.5 | 860 | 150 | 825 |
| 141 | 3.0 | 1.0 | 850 | 145 | 825 |
| 142 | 3.0 | 1.5 | 815 | 130 | 810 |

Tables 6 to 10 reveal that in contract with the comparative batteries [Sample Nos. C4–C6], the nickel-metal hydride batteries [Sample Nos. 72–142] of the invention are comparable to the foregoing nickel-metal hydride batteries [Sample Nos. 1–71 ] of the invention in advantages. This substantiates that the synergistic effect due to the presence of two kinds of hydrogen absorbing alloys which are different in properties, i.e., the copper-coated hydrogen absorbing alloy powder A having high electric conductivity and the cobalt-coated hydrogen absorbing alloy powder B outstanding in battery internal pressure characteristics and cycle characteristics, is similarly available regardless of the different methods of preparing the powders.

The present invention is not limited to the foregoing embodiments in the structure but can be modified variously within the technical scope set forth in the appended claims. For example, while a hydrogen absorbing alloy having a crystal structure of the $CaCu_5$ type is used as the hydrogen absorbing alloy serving as the starting material, hydrogen absorbing alloy electrodes can be prepared according to the invention using hydrogen absorbing alloys having a Laves phase structure of the C14 or C15 type.

What is claimed is:

1. A hydrogen absorbing alloy electrode consisting mainly of a mixture of a first hydrogen absorbing alloy powder A formed on surfaces of particles thereof with a surface layer containing metallic copper or a copper oxide and a second hydrogen absorbing alloy powder B formed on surfaces of particles thereof with a surface layer containing metallic cobalt or a cobalt oxide.

2. A hydrogen absorbing alloy electrode according to claim 1 wherein the first hydrogen absorbing alloy powder A is smaller than the second hydrogen absorbing alloy powder B in particle size.

3. A hydrogen absorbing alloy electrode according to claim 1 wherein the amount of the first hydrogen absorbing alloy powder A is not greater than the amount of the second hydrogen absorbing alloy powder B in the mixture.

4. A hydrogen absorbing alloy electrode according to claim 1 wherein the proportion of the second hydrogen absorbing alloy powder B in the mixture is 5 wt. % to 50 wt. %.

5. A process for producing a hydrogen absorbing alloy electrode having a step of preparing a first hydrogen absorbing alloy powder A, a step of preparing a second hydrogen absorbing alloy powder B, and a step of preparing an electrode by mixing together the two kinds of hydrogen absorbing alloy powders obtained by these steps and forming the mixture into a predetermined shape, the first hydrogen absorbing alloy powder A being prepared by surface-treating a hydrogen absorbing alloy powder with an acid solution containing a copper chloride and adjusted to a pH value of 0.7 to 2.0, the second hydrogen absorbing alloy powder B being prepared by surface-treating a hydrogen absorbing alloy powder with an acid solution containing a cobalt chloride or cobalt hydroxide and adjusted to a pH value of 0.7 to 2.0.

6. A process for producing a hydrogen absorbing alloy electrode according to claim 5 wherein the copper chloride is contained in an amount of 1.0 wt. % to 5.0 wt. % based on the weight of the hydrogen absorbing alloy, and the cobalt chloride is contained in an amount of 1.0 wt. % to 5.0 wt. % based on the weight of the hydrogen absorbing alloy.

7. A process for producing a hydrogen absorbing alloy electrode according to claim 5 wherein the cobalt hydroxide is contained in an amount of 0.3 wt. % to 1.0 wt. % based on the weight of the hydrogen absorbing alloy.

* * * * *